L. B. ODSON.
PULLEY CORD CLIP.
APPLICATION FILED APR. 7, 1921.
1,405,426. Patented Feb. 7, 1922.
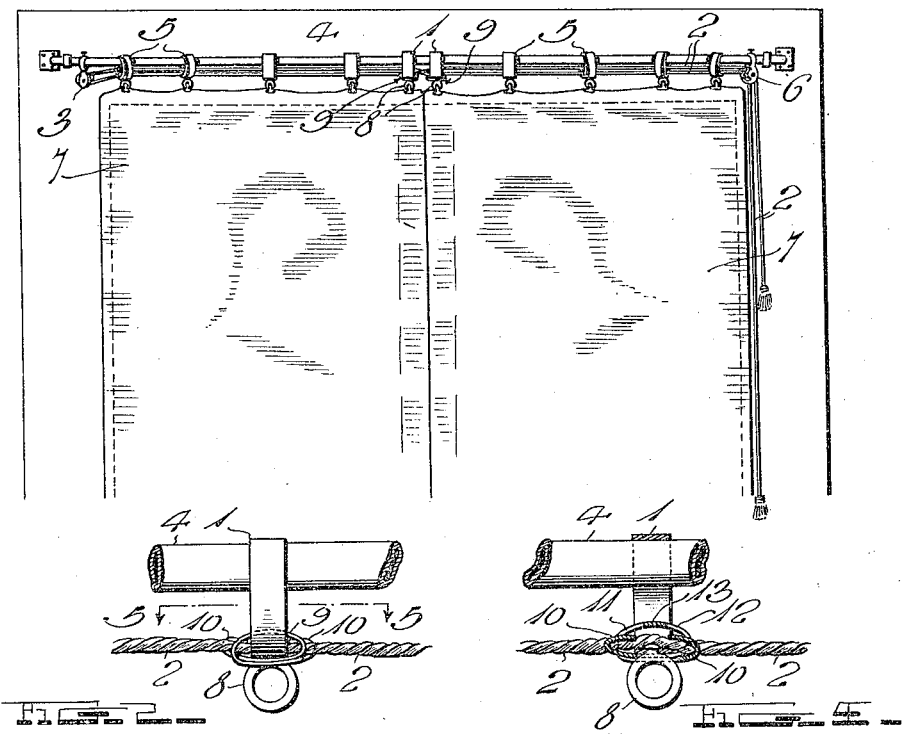
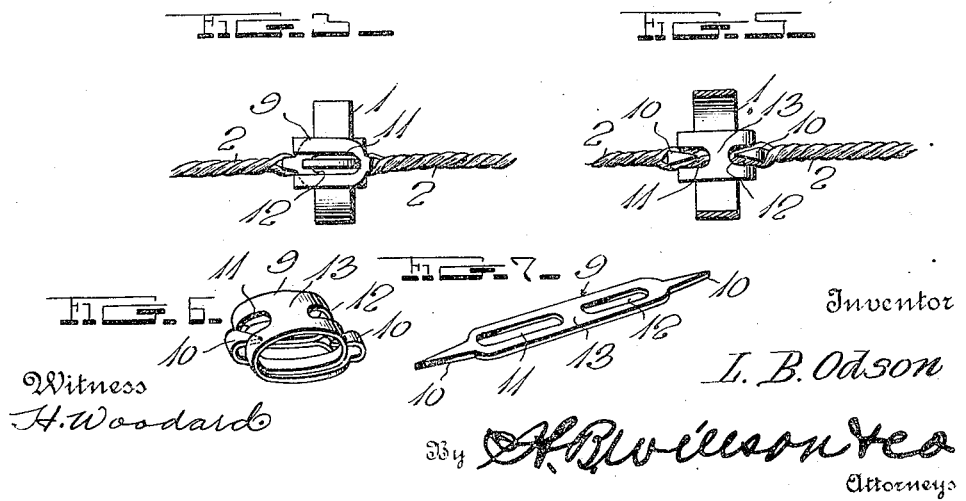
Inventor
L. B. Odson

UNITED STATES PATENT OFFICE.

LENNA B. ODSON, OF SPOKANE, WASHINGTON.

PULLEY-CORD CLIP.

1,405,426.

Specification of Letters Patent.   Patented Feb. 7, 1922.

Application filed April 7, 1921. Serial No. 459,326.

*To all whom it may concern:*

Be it known that I, LENNA B. ODSON, a citizen of the United States, residing at Spokane, in the county of Spokane and State of Washington, have invented certain new and useful Improvements in Pulley-Cord Clips; and I do declare the following to be a full, clear, and exact description of the invention, such as will enable others skilled in the art to which it appertains to make and use the same.

This invention relates to a pulley cord clip for securely connecting curtain rings with a curtain actuating cord passed through pulleys and curtain supporting rings and one object of the invention is to provide a clip so constructed that it may be mounted upon the cord and after being passed through the ring have its end portions bent to firmly engage the cord and thus firmly tie the ring to the cord so that when a pulley cord is moved, the rings tied to the cord by the improved clip will move along a curtain pole and thus cause the curtain to move to an open or a closed position.

Another object of the invention is to so construct this clip that an eye carried by a ring for receiving a curtain engaging hook may pass through slots formed in the clip and thus positively anchor the ring to the cord so that the cord cannot move without moving the ring with it.

Another object of the invention is to so construct this clip that prongs carried by the overlapped and slotted end portion of the clip through which the depending eye of the ring will pass, may be passed through the cord and bent over, or in other words, clinched to securely hold the clip in place and prevent the cord from slipping through the clip.

Another object of the invention is to provide a clip which can be formed of pliable sheet metal and may thus be easily bent into an operative position and may also be readily rebent thus permitting the clip to be easily bent to engage or release a ring and further permitting the clip to be used many times.

Another object of the invention is to provide a clip which can be stamped from thin sheet metal and thus cheaply produced.

Another object of the invention is to provide a clip of the character described which will be very convenient for use by an inexperienced person and which will further not be unsightly when in use and further will permit the rings to be moved close together and allow the curtains to hang correctly.

This invention is illustrated in the accompanying drawings, wherein:

Figure 1 is a view in elevation showing the clips in use.

Figure 2 is an enlarged view in elevation showing one of the clips in use.

Figure 3 is a bottom plan view of the structure shown in Fig. 2.

Figure 4 is a view showing the structure of Fig. 2 with the clips and rings in longitudinal section.

Figure 5 is a sectional view taken along the line 5—5 of Fig. 2.

Figure 6 is a perspective view of the clips bent to the position assumed when in use.

Figure 7 is a perspective view of the clips before being used.

This clip is used for connecting the rings 1 with a curtain operating cord 2 so that when the cord is drawn upon, the rings 1 will move with the cord. This cord is passed through a double pulley 6 mounted adjacent one end of a curtain pole 4 and is then passed through the curtain rings 1 and 5 and passed through a single pulley 3 after which it is passed back through the rings and double pulley and the cord cut the proper length. Suitable hooks are carried by the curtains 7 for passing through the eyes 8 of the rings. Since the rings 1 are to be securely anchored upon the cord 2, it will be readily seen that when one end portion of the cord is drawn upon, the two curtains 7 will be moved in opposite directions and thus moved to a closed or opened position. This is a conventional manner of mounting portières, curtains and the like, and it has been customary to tie knots in the cord at the rings 1 or to draw the cord together about the rings and sew it together. If a single knot is provided, the rings 1 may readily slip out of the desired position upon the cord and if a double knot is formed, this provides an unsightly appearance. The provision of stitches will securely anchor the rings 1 to the cord but a needle cannot be easily forced through hard twisted cord and further the stitches are liable to be broken. These cords often need adjustment and it is a tedious job if stitches are used. In order to overcome the objections noted above, the improved clip which will now be described has been provided.

A clip will be provided for each of the rings 1 and since these clips are of a duplicate construction, a description of one will suffice for both. This clip is formed of pliable sheet metal and is stamped to provide an elongated body 9 having pointed cord penetrating prongs 10 at its ends and having longitudinally extending slots 11 and 12 which are formed in substantially alined positions and will provide a cross bar 13 intermediate the length of the body of the clip. It should be noted that the slot 11 is longer than the slot 12 and that therefore the cross bar 13 is not positioned at the center of the clip but somewhat to one side thereof. A clip is placed upon each flight of the cord with the cord passing through the slots 11 and 12 and the two flights or end portions of the cord passing through the rings of the pole and through the double pulley 6. In order to lock one of the rings 1 to the cord, the clip will be moved along the cord so that it extends through the ring as shown in Figs. 2 and 3. The cross bar 13 will be positioned directly above the cord within the ring as shown in Fig. 3 and the end portion having the shorter slot 12 will then be bent as shown with the eye 8 extending through the slot 12 and the prong which has previously been bent at right angles to the body of the clip extending upwardly toward the cord. The second end portion of the clip having the longer slot 11 will then be bent to extend in overlapping relation to the end portion having the slot 12 as shown, with its bent prong extending upward toward the cord. From an inspection of Figs. 3 and 5, it will be seen that when the two end portions have been folded to extend in overlapping relation, the prong of the shorter end portion will extend through the slot 12. These prongs will be passed through the cord and between the strands thereof and will be bent or in other words clinched as shown in Fig. 3. The ring will thus be securely anchored upon or in other words tied to the cord and further the clip will be securely fastened to the cord. Therefore, when the cord is moved, the clips will move with the cord and since the two rings 1 are firmly anchored to the cord by the clip, these rings will move along the curtain pole. From an inspection of Fig. 1, it will be seen that the flights of the cord are crossed between the two rings 1 and therefore when the shorter end portion of the cord is drawn upon, the two rings 1 will move in opposite directions and as previously stated move the curtain or portière to an open or a closed position. When so desired, the clip can be easily bent back to release the rings for purposes of readjustment or may if so desired be entirely removed from the cord and bent out flat as shown in Fig. 7. It will thus be seen that the clips are so constructed that they will be very convenient to use and further may be used many times. It will be further noted that the clips will serve to firmly anchor the two rings 1 upon the flights of the cord and will not only be very efficient in operation but will be neat in appearance.

I claim:

1. A pulley cord clip formed of pliable material and having substantially alined slots formed therein, and means for anchoring the ends of the clip to a cord passed through the slots, when the end portions of the clips are bent to extend in overlapping relation.

2. A pulley cord clip formed of pliable sheet metal and having cord penetrating prongs at its ends, the body portion of the clip having longitudinally alined slots formed therein and terminating in spaced relation.

3. A pulley cord clip formed of a strip of pliable sheet material having longitudinally extending substantially alined slots terminating in spaced relation and providing cord receiving slots and a cross strip between the slots for extending above a pulley cord passed through the slots and retaining the clip upon the cord, the end portions of the strip being adapted to be bent in overlapped relation with the cord and clip extending through a curtain ring, and means for anchoring the ends of the clip to the cord after being folded about the ring.

4. In a curtain support, a ring, a cord passing through the ring, and a pliable clip carried by the cord and passing through the ring and having its end portions bent about the ring and provided with prongs clinched in engagement with the cord.

5. In a curtain support, a ring having a depending eye, a cord extending through the ring, and a clip slidably mounted upon the cord and extending through the ring and having slotted end portions bent back into overlapping relation with the eye of said ring positioned in the slots of the clip.

In testimony whereof I have hereunto set my hand.

LENNA B. ODSON.